Dec. 28, 1965  SHIN-ICHI TOKUMOTO  3,226,307
MULTICOLOR PICTURE FILM
Filed Jan. 5, 1961
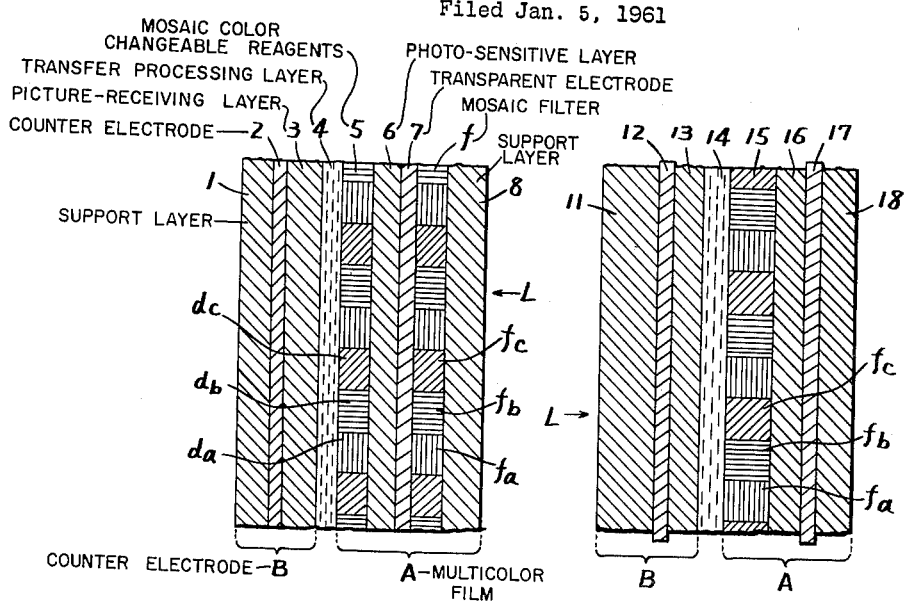
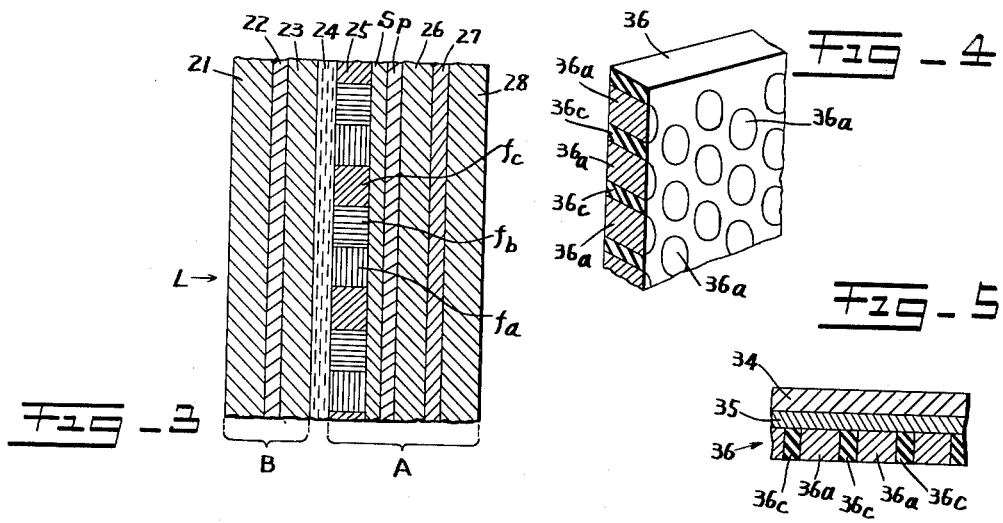
Inventor
Shin-ichi Tokumoto
by Hill, Sherman, Meroni, Gross and Simpson  Attys.

3,226,307
MULTICOLOR PICTURE FILM
Shin-ichi Tokumoto, Chiyoda-ku, Tokyo, Japan, assignor to Sony Corporation, a corporation of Japan
Filed Jan. 5, 1961, Ser. No. 80,803
Claims priority, application Japan, Jan. 5, 1960, 35/143
19 Claims. (Cl. 204—2)

The present invention relates to a multicolor picture film and more particularly to a multicolor picture film to be used in electrophotography of developing a picture of a subject by means of exposure and passage of current.

One of the main subjects of the present invention is to produce multicolor picture directly in a single step, in contrast with hitherto known systems, without the use of separation images in the said electrophotography.

Another object is to produce multicolor picture film, making use of the principle of electrophotography.

Still another object is to produce multicolor picture film, making use of the transfer process.

A still further object is to provide a relatively simple, direct and low cost picture film for the production of multicolor photographs, prints, posters and signs.

These and other objects will be apparent from the following description.

The multicolor picture film of the present invention is characterized in that color changeable reagents for more than two colors capable of being selectively colored, are made insoluble or faded by the passage of current are applied on or impregnated in a supporting material such as paper in the form of mosaic in a current-passable state.

The multicolor picture film of the present invention will, by way of examples, be exemplified in detail in the following description.

The features of the film of this invention are successively explained as follows:

The passage of current to color, to make it insoluble, or to fade the said color changeable reagent, involves passing a current through each part of the picture film in such a mechanism so that the photoimage of the subject is formed on the film of the present invention and the current is passed in an amount corresponding to the light values and the colors of each part of the subject through the said each part of the film. Thus, the desired picture will be formed by the degrees of the change of the color changeable reagents effected in accordance with the difference of amounts of current passed through each part of the film.

Accordingly, the said selective passage of current must be in close relation to the light intensity and the colors of each part of the subject, so as to form the picture pattern. The said selective passage of current in relation to the light intensity and the colors of each part of the subject may be carried out in such a manner that the current can suitably be controlled by a photosensitive layer such as photoconductive layer, photovoltaic layer or photosensitive layer, which has the same effect as that of photodiode or that of phototransistor parallel to the mosaic surface of color changeable reagent of this picture film.

Photosensitive cadmium sulfide or zinc oxide or others may be specified as examples of material to constitute the said photoconductive layer. Combined materials of selenium with metallic thin film and others are usable examples of photovoltaic materials or photosensitive materials which have the same effect as that of photodiode. Such combined materials act as photovoltaic body or can be used as photodiode by connecting with an external electric power source in such a manner that the passage of current is interrupted against a voltage based on the electromotive force of the said power source when the combined materials are not exposed to the light and the current can be passed only after they are exposed. However, since the layer of combined materials of this kind has a low electric resistivity in the plane direction of the said layer, it is necessary to divide this layer of the combined materials into numerous points which are electrically isolated from each other and to arrange them in one layer, as illustrated by the accompanying drawings.

Cadmium sulfide covered with copper monooxide is an example of material which may constitute the layer having the same effect as that of phototransistor.

While the photovoltaic layer and photodiode layer are to be explained later, the photoconductive layer and phototransistor layer can be exemplified as follows:

*Example 1*

(A) Photo-conductive layer: Grams
Cadmium sulfide powder containing 1/10,000 Cu. (Particles of 5 to 15 microns in diameter)_
Ethoxy resin (Araldite) _____ 8
Diaceton alcohol _____ 32
Hardener _____ 1.6

A mixture of the above ingredients is spread in the form of film and dried, and the dried film is 70 microns in thickness.

When a potential of 90 volts is imposed on this photoconductive layer under the degree of illumination of 1 ft.-c. (foot-candle), photocurrent of 15 mA./cm.$^2$ is obtained.

(B) Phototransistor layer: Phototransistor material—
Cadmium sulfide powder containing 5/10,000 indium sulfide and clothed with very thin layer of copper monooxide. (Particles of 0.3 to 3 microns in diameter.)

The composition of the mixture and the manner for producing a film are the same as the above A.

When a potential of 90 volts is imposed on this phototransistor layer having 50 microns in thickness, photocurrent of 3 mA./cm.$^2$ is obtained.

Moreover, the said current flowing through the picture film may be not only a direct current in a certain direction but also an alternating current. When using the alternating current, however, it is necessary that the color changing reaction of the color changeable reagent in the picture film is not completely reversible.

*Example 2*

Examples of such reagent may be specified as follows:
In the coloring process, for cyan color a combined color changeable reagent of 2-amino-5-diethylaminotoluene, dimethyl-p-phenylenediamine or diethyl-p-phenylenediamine with 2-4-dichloro-1-naphthol can be used; for magenta color a combined color changeable reagent, using p-nitro-phenylacetonitrile instead of 2-4-dichloro-1-naphthol of the said color changeable reagent of cyan color can be used; and for yellow color a combined color changeable reagent, using acetoacetoanilide instead of the said 2-4-dichloro-1-naphthol, and the like can be used.

In these kinds of color changeable reagents, the said reagent at the current-passed part can be colored and made insoluble by passing a current, using an electrolyte such as aqueous solution of sodium chloride or bromide and the like, and can also be faded with acids which are produced by electrolysis.

The mechanism is that the electrolyte such as NaCl or NaBr is decomposed by the passed current and Na and Cl or Br are producted, and the said color changeable reagents are all oxidized (oxidation in a broad sense including chlorination, bromination and the like) in an alkaline medium and colored and made insoluble in an alkaline solution. That is, these color changeable reagents are suitable examples capable of being colored and made insoluble by use of direct current of alternating current since Na formed by electrolysis reacts directly on water and becomes NaOH, and Cl is useful for the said oxidation.

Also, a reversal picture can be obtained by transferring the uncolored part of the said picture film on another sheet, using a suitable liquid for transfer processing such as solution of sodium hydroxide and the like. Concrete examples of the mode of using these color changeable reagents will be shown later.

*Example 3*

For another example, in the fading method, dyes such as methylen blue, rhodamine B, auramine and others can be used by making the said dyes respectively into 0.5% solution and impregnating this solution in or applying a mixture consisting of 2 cc. of the said solution and 5 g. of 20% gelatine solution onto the supporting material in the form of mosaic without one lying upon another. The method of applying on or impregnating in the supporting material will be exemplified later.

The color changeable reagent on the current-passed part can be faded when a few percent of electrolyte such as sodium chloride are added to the said solution of the color changeable reagent and then the current is passed therethrough. Accordingly, an oxidizing substance produced by electrolysis, such as chlorine and the like, is caused to react on the color changeable reagent.

For examples of the color changeable reagents to be used in the present invention, the following color changeable substances may be preferably used which are respectively capable of being colored, made insoluble or faded by the passed current.

(1) Indicator dyes such as quinoline blue come under the color changeable reagent to be colored and faded in accordance with the change of medium, viz., the change of pH.
(2) Color changeable reagent colored and faded by the oxidation and reduction are those based on the formation of leucosalts. That is to say, dyes such as those of anthraquine-series, indigoid-series, and triphenylmethane-series and sulfide dyes. For example, indigo, pararosaniline, phenol blue and the like are specified. Further, dyes such as azine dyestuffs made from amino compounds such as aniline and paramine, for example, safranine T and the like come under these reagents.
(3) Color changeable reagents colored by coupling are those such as azoic dyes forming insoluble azo dyes. For example, rapidazol IB, paranitranine and the like come under these. Further, color changeable reagents colored by coupling of photographic coupler and developer are those such as dyes of anthraquinone-series, to which hydroquinone is attached, and azo dyes, namely, phenylazohydroquinone 2 - hydroxynaphthylazohydroquinone, 1,4-bis (2',5'-dihydroxyaniline)anthraquinone and the like.
(4) Basic dyes which are capable of being faded include: Thioflavine, fuchsine, thionine blue and the like come under these.

The said color changeable reagents exemplified above may directly be impregnated in such supporting material as paper in the form of mosaic or may be applied on the said material in the form of mosaic by the procedure of coating the supporting material.

*Example 4*

The cyan color former, mentioned above, may be obtained by the following process: monohydrochloride, 3 g. of triphenyl phosphate and 1 cc. of 5% aqueous solution of sodium hydroxide were mixed together. After the mixture was heated and shaked, 0.117 g. of 2,4-dichloro-1-naphthol was added to the said mixture. The resulting mixture thus produced was favorably emulsified in 20 g. of 10% aqueous solution of gelatine, using a small quantity of emulsifier such as lauryl sulfate. The magneta color former and yellow color former can also be treated in a similar manner. In that case, the triphenyl phosphate has an action of preventing 2-amino-5-diethylaminotoluene from air oxidation.

It is favorable to use as supporter a thin film having water-permeability and ion-permeability, such as paper which may be impregnated or coated with gelatine, sheet which may be produced by making polyvinyl alcohol water-insoluble by means of dimethylol urea and others, sheet which may be produced by making sodium carboxyl-methyl cellulose water-insoluble by means of dimethylol urea, trimethylol melamine, lead acetate or others, and the like. Moreover, for the purpose of preventing these thin films from expanding by moisture, it is preferable to have them coated on a net of nitrocellulose, or metallic net coated with an insulating paint such as enamel and the like, or an uncoated metallic net, either one of which cannot or hardly be swelled by moisture.

In the multicolor picture film of the present invention, a picture or an image can be formed on the surface of the said film by selectively passing a current of different strength through each part of the surface. Accordingly, it is often convenient that electrodes necessary for passing a current is included in the constituting components.

For example, the naked metallic net previously shown as example of nets effectively used for the purpose of preventing the unfavorable effect of expansion of supporter can also serve for this kind of electrode. When the metallic net is used as electrode, it is desirable that the net has at least 50 meshes per inch in relation to the resolving power of the image.

As electrodes, a metallic thin film, a conducting paint and a transparent conductor film, for example, of tin oxide and the like are used. Material for electrode is not necessarily limited to the materials exemplified above since any conductive material will be suitable for this purpose. These kinds of electrodes can, of course, be used as a part or the whole of the supporter. Also, the handling of the supporter can readily be made if a thick sheet of paper, sheet of acetate cellulose or the like is used for reinforcement in the part of the supporter where passage of current is not required.

Moreover, when the aforesaid photosensitive layer which controls the passage of current in relation to the light intensity and the colors in each part of the subject is used as a part of the supporter, the picture film can be extremely easy for handling. The mode of making this kind of multicolor picture film will later be illustrated with reference to the drawing.

The typical modes for applying the aforesaid color changeable reagents containing more than two colors on the supporter, or for impregnating the said reagents in the supporter in the form of mosaic in a current-passable state are explained as follows:

For example, an emulsion produced by mixing respectively the aforesaid cyan color former, magenta color former and yellow color former with triphenyl phosphate and gelatine can be made current-passable, because an aqueous solution of electrolyte, e.g., NaBr and the like can be impregnated in the emulsion. One of the advantageous methods of applying the emulsion in the form of mosaic is to use the printing process.

The current that is to act selectively, among mosaically arranged color changeable reagents, on one certain color has to be obtained by means of the light coming in through a colored filter that corresponds to that of the above reagents to be effected. Therefore, except for the case where color changeable reagents and corresponding filters are to be arranged mosaically on the photo-sensitive layer in combined unit, the color changeable reagents to form a mosaic must be arranged in a regular order. Highly expedient in this respect is the printing process.

The layers containing the color changeable reagents and the colored filter layer can be positioned on the same side of the photosensitive layer or on its sides opposite to each other.

In any case, it is necessary to pass the rays irradiated on the photosensitive layer through at least the colored filter layer.

In order to illustrate the relative position of the aforesaid layer containing the color changeable reagents, colored filter layer and photosensitive layer as well as the coming direction of the light for exposure, reference is made to the accompanying drawing and in which:

FIG. 1 is an enlarged sectional view of a part for the purpose of explaining an embodiment of the multicolor picture film of the present invention.

FIG. 2 is a similar sectional view of another embodiment of the present invention.

FIG. 3 is a similar sectional view illustrating still another embodiment having further more constituting elements.

FIG. 4 is a fragmental enlarged perspective view of essential parts for the purpose of illustrating an example of photosensitive layer to be used for the multicolor picture film of the present invention and FIG. 5 is an enlarged sectional view of a part of the similar photosensitive layer.

In the drawing, FIG. 1 shows a type in which layer 5 containing color changeable reagents and colored filter layer $f$ are separately positioned on the opposite sides of a photosensitive layer 6. In this FIG. 1, pile A of layers of from 5 to 8 shows the multicolor picture film of the present invention. The part designated as B is shown here only to indicate the relative positions of counter-electrode 2 for passing a current and of picture receiving layer 3 for transfer, with the said multicolor picture film A. Layer 1 is a supporter consisting of paper and the like for supporting the electrode 2 and/or the picture receiving layer 3, and layer 4 shows a layer of electrolyte solution or transfer processing liquid to be cast in between the said A and B during the passage of current or during the transfer. Layer 5 consists of mosaically arranged color changeable reagents having hues different from each other hue, such as $da$, $db$, $dc$ and the like. Layer 6 is the photo-sensitive layer, and layer 7 the transparent electrode. Layer $f$ shows the colored filter layer, and it consists also of colored filters for color separation in the form of mosaic such as $fa$, $fb$, $fc$ and the like. The color changeable reagents $da$, $db$ and $dc$ and the colored filters $fa$, $fb$ and $fc$ have hues relating and corresponding to each other as described above. Layer 8 shows an adhered transparent supporting material such as acetate cellulose film and the like for the purpose of reinforcing the multicolor picture film so as to facilitate its handling.

The exposing rays are irradiated on the multicolor picture film of this type from the direction L, so as to pass through the transparent supporter 8, the colored filter layer $f$ and the transparent electrode 7 and then reach the photo-sensitive layer 6.

FIG. 2 shows a type in which layer 15 which contains both color changeable reagents and colored filters is positioned on one side of the photosensitive layer 16. In this figure, pile A of layers from 15 to 18 shows the multicolor picture film of the present invention. The part designated as B is also shown here only to indicate the relative positions of the counter-electrode 12 for passing a current and of the picture receiving layer 13 for transfer, with this multicolor picture film A. Layer 11 is a supporter consisting of paper and the like for supporting the electrode 12 and/or the picture receiving layer 13, and layer 14 a layer of electrolyte solution or transfer processing liquid to be cast in between the said A and B during the passage of current or during the transfer. Of layer 15, $fa$, $fb$ and $fc$ forming a mosaic, are each composed both of colored filter for color separation with a different hue from one another and color changeable reagent with its hue corresponding to that of the filter. The colored filters and the color changeable reagents may be laminted in two layers, or dyes for colored filters and color changeable reagents may be in a mixed state.

It is, however, desirable that the reagents be little colored and transparent as well, so as not to hinder the color separation of the rays for exposure, in case that the colored filters and color changeable reagents are placed on the same side of the photo-sensitive layer as shown in FIG. 2. Layer 17 is an electrode and layer 18 a supporter made of acetate cellulose and the like for the purpose of reinforcing this picture film so as to facilitate its handling.

In the case of the multicolor picture film of this type, it is necessary to irradiate the exposing rays on the photosensitive layer from the direction L as shown in FIG. 2, except for the case of passing a current after exposure, and accordingly, each layer 11, 12, 13 or 14 must be little colored and transparent.

The case where the color changeable reagents are contained in the colored filters and and the colored filters are applied on the photosensiitve layer in the form of mosiac, will be explained in the following:

*Example 5*

The color changeable reagents which are colorless, and transparent as possible are selected. For example, the emulsion obtained by mixing respectively the cyan color former, magenta color former and yellow color former with triphenyl phosphate and gelatine exemplified above in Example 4 is sufficiently suitable for this purpose.

This emulsion is first diluted with the same quantity of water as that of the emulsion and heated to about 40° C. and then sprayed, by means of a sprayer, into a wind chamber of running dry hot air. According to the experiment, the sprayed particles, even when they had a size of 50 microns, were dried and became spherical particles during their passage of the wind chamber of ca. 3 meters in length. Finer particles can be dried more rapidly. When the particles thus obtained were collected and immersed in an organic solvent such as toluene or xylene, the color changeable reagents on the surface of particles were dissolved in an organic solvent, whereby semitransparent and almost colorless particles were obtained. Particles, which contain the color changeable reagents in their interior and whose exterior were covered with gelatine, could be produced by this treatment.

When some amount of sodium sulfite was added to the aforesaid emulsion and the above-mentioned operation was carried out, harmful oxidative coupling could be prevented, but it was noticed that a larger amount of electricity was required in forming a picture, as compared with the case where sodium sulfite was not added. In order to avoid this disadvantage, the multicolor picture film of the present invention was made with the layer of color changeable reagents which contain no such component that in itself is extremely easily oxidizable like 2-amino-5-diethyl-aminotoluene. Namely, the emulsion of a component in itself extremely easily oxidizable like 2-amino-5-diethyl-aminotoluene was removed.

In this case, the color changeable reagents in the aforesaid fine particles have no color and no hindrance to the selective passage of the color light was noticed even if these fine particles were colored with dyes for colored filter, which will be described later. However, a part of the color changeable components, which has not been contained in the layer containing color changeable reagents as in examples set forth above, must be furnished at a suitable time.

As it will be apparent from the foregoing, it should be understood that the case where the color changeable reagents are contained in the multicolor picture film of the present invention includes a case where the reagents are only a part of the color changeable components necessary for presenting the desired colors.

The constituents of fine particles containing the color changeable reagents as described above, e.g., the gelatine or triphenyl phosphate in the aforesaid examples are to be dyed with dyes having the hue corresponding to the color changeable reagent contained in these fine particles. For example, it is desirable that fine particles containing cyan color changeable reagents be dyed red, those containing magenta color changeable reagent dyed green, and those containing yellow color changeable reagent dyed blue.

*Example 6*

How to make the mosaic is exemplified as follows:

These fine particles of more than two kinds of colors were mixed in a suitable proportion and the mixture was then spread on the supporter such as paper and the like by means of a suitable binder, e.g., gelatine and the like as evenly as possible so that these fine particles did not superimpose or lie one upon another.

The method of spreading the said fine particles is that an aqueous solution of gum arabic or gelatine was first applied thinly on the surface, on which these fine particles are to be applied, and then the said fine particles were spread thereon or absorbed thereinto, utilizing electrostatic attractive force. If the coated surface is softly beaten, the fine particles did not almost substantially lie one upon another and were arranged uniformly in the desired state. However, as numerous gaps are liable to exist between the fine particles, this particle layer was further compressed from its surface until the thickness of the layer was reduced to about ⅗ to ½ of its initial thickness, thereby the gaps were filled up and almost reduced to nil. For example, this can be carried out in such manner that a particle layer having a thickness of about 25 microns is compressed to that having a thickness of 15 to 10 microns.

When compressed as described above, the particle layer still had slight gaps remaining to allow permeation of light, and therefore, in order to fill them up completely the layer had to be impregnated, for example, with paraffin dyed black.

When a multicolor picture is to be taken, using the film produced as above, the side coated with fine particles of the said photo-sensitive layer is turned to the subject, exposed to the light and the desired current is passed through the layer. It is, of course, necessary that the electrode positioned in the path of the light between the subject and the photo-sensitive layer is transparent in the case where the exposure and the passage of current are carried out at the same time, except for the case where the current is passed after exposure.

In the case where as already shown, the hue to be formed by color changeable reagents and that of fine particles or filter stand in complementary color relations; when, for instance, red light comes in, among the particles located in its way, red-colored ones only allow it to pass, and therefore only such parts of the photo-sensitive layer as are under these particles receive the light and pass the current. In effect, the cyan color former contained in the red colored particle is colored and made insoluble as it is.

Then an image receiving layer, for example, such as gelatine layer, is applied to the surface where the said particles are arranged, and a transfer processing liquid or paste, for example, 3% aqueous alkaline solution is cast in between the said surface and the said image receiving layer, thereby the unreacted color changeable reagent is moved to the image receiving layer.

In this example, only cyan color changeable reagent remains at the position, where the red light reached, on the film coated with particles, and magenta and yellow color changeable reagents move to the said receiving layer, where they are oxidized and develop red.

By the same principle, cyan and yellow color changeable reagents move to the position of the image receiving layer corresponding to the position, where the green light was irradiated, of the photo-sensitive layer and develop green at the said position.

Further, in the same manner cyan and magenta color changeable reagents move to the position of the blue light, and this position can be turned blue and no color changeable reagent moves to the position of the white light, and accordingly, this position can remain as the original color of the image receiving layer, namely, colorless or white. At the position of the photosensitive layer, where the light did not reach, all the color changeable reagents acting as the subtractive process move to the image receiving layer, and thereat develops black.

Material to be used in the image receiving layer is not necessarily restricted to gelatine, if it is any material capable readily of absorbing liquid, but polyvinyl alcohol and the like are also used.

The image receiving layer can be affixed to or applied to an opaque or transparent support such as paper or acetate cellulose film and the like. Also, it can be placed on a net-like or translucent electrode for passing a current, such as contained in the multicolor picture film previously mentioned.

*Example 7*

The type of the multicolor picture film shown in FIG. 2 able to be used was as follows:

The picture film in this example had the following constituents.

Supporter 18 was a paper of 0.4 mm. in thickness. Electrode 17 was a lead film of 0.032 mm. in thickness. Photo-sensitive layer 16 was the photo-conductive layer indicated in Example 1.

Colored filter layer containing color changeable reagent 15 was made like the case with Examples 5 and 6. This layer did not contain the easily oxidizable reagent (2-amino-5-diethylaminotoluene). The binder applied between photo-sensitive layer and the layer of color changeable reagent was polyvinyl methyl ether.

The layer 15 was about 10 microns in thickness.

| Electrolyte: | Grams |
|---|---|
| Water | 100 |
| 2-amino-5-diethyl-aminotoluene mono-hydroxy chloride | 0.5 |
| Sodium carboxy methyl cellulose | 3 |
| Sodium chloride | 6 |
| Transfer processing liquid: | |
| Water | 100 |
| Sodium carboxy methyl cellulose | 6 |
| Sodium hydroxide | 1 |

Receiving layer was made of gelatine being impregnated with a solution of 0.25% copper sulfate.

In the conditions as described above the optimum amount of electricity to obtain a good multicolor picture in this transfer process was 5.6 mA. sec./cm.$^2$ at the high light part.

The above examples show only the case that is the color changeable reagent which is to be moved and transferred to the image receiving layer, but if the cellulose acetate hydrogen phthalate admixed with the equivalent quantity of silica aerogel is used as binder for affixing the aforesaid fine particles to the surface of the photo-sensitive layer or to the supporter such as paper and the like, an alkali is produced by electrolysis at the position affected by current and makes this binder soluble so that not only color changeable reagent but also fine particles at the said position can be removed from the layer containing the color changeable reagents to the image receiving layer.

Cellulose acetate hydrogen phthalate described above is insoluble in acidic or neutral water and has a low degree of water-permeability but is soluble in an aqueous alkaline solution. Substances of this kind, generally called enteric material, can be used for the same purpose.

Another method of the formation of a picture by the transfer process lies in that for the purpose of clothing of color changeable reagents such substance is utilized as the said cellulose-acetate hydrogen phthalate which, on reacting with the product of electrolysis, loses its effect as clothing material. The said clothing material, when and where passed by current, gets differentiated in its liquid-permeability, and this causes the color changeable reagents clothed in it to differ from one another in their transferability.

In this manner the formation of picture on picture receiving layer by the transfer process can be done.

The layer of color changeable reagents, prepared as above, reduces to a great extent the amount of electricity required to obtain a picture of the desired density; in other words, it can be utilized for photographic material of the sensitization type.

That is to say, only an amount of electricity enough to denature a very small part of the clothing material can well render the whole color changeable reagent transferable or the whole reacting agent reactive. The thinner the clothing material is and the more the reagent contained, the greater sensitivity can be obtained.

*Example 8*

Explaining with another example, methylene blue and rhodamine, which are water-soluble dyes, were used as color changeable reagent. These reagents were respectively clothed with extremely thin film of non-water-permeable clothing material, such as cellulose acetate hydrogen phthalate, and made into fine particles. These fine particles were mixed with a suitable amount of gelatine, made into layer-shape of mosaic of 10 microns thickness by means of the printing and used as a layer containing the color changeable reagent for the multicolor picture film.

Also, liquid containing electrolyte capable of forming alkali as product by the passed current, such as aqueous NaCl was made into paste, being mixed, if necessary, with material such as sodium carboxymethyl cellulose, and used as electrolyte solution.

Current polarity was so selected that NaOH, which was the product by the passed current, could react on this clothing material. Namely, it was fit to make the electrode near this clothing material a cathode. If the picture film be exposed to the light in this state and current be passed through it, the cellulose acetate hydrogen phthalate becomes water-soluble or water-permeable.

The parts of the clothing material, which had not been subjected to the action of NaOH, the product by the passed current, were not water-permeable and only the dyes such as methylene blue or rhodamine clothed with the clothing material, which had received the action of the product by the passed current and been made water-permeable, fade, when this layer of the color changeable reagent was subjected to the action of the agent such as chlorine water and the like. The dyes clothed with clothing material, which had not received the action of the product by the passed current, did not fade. Thus, picture having sufficient density, good contrast and clarity could be produced.

It is advantageous to differentiate the thickness of the said clothing material of every particle for the purpose of obtaining the difference of density proportional to the amount of the passed electricity.

It is also advantageous to mix cellulose acetate hydrogen phthalate with substance such as polyvinyl butylal, which does not react at all or react extremely very little with the product by the passed current.

It is to be noted that sensitivity increases with increase to the proportion of substance such as polyvinyl butylal.

In the example shown above, the case, where the clothing material facilitates the permeation of liquid by means of the product by the passage of current, was stated. The reverse case, namely, the case where the permeation of liquid is made difficult by means of the product by the passage of current is shown in the following.

In this case, it is fit to use protein as clothing material and salt having an acid radical as electrolyte in such manner that acid, which is the product by the passage of current, can react on the said clothing material.

In any of the said examples, the case, where the color changeable reagent is covered with clothing material, was shown, and accordingly, another case is described, by way of example, as follows:

In the example where emulsions produced by respectively mixing cyan changeable reagent, magenta changeable reagent and yellow changeable reagent with triphenyl phosphate and gelatine, are used as color changeable reagents, fine particles of an oxidizing agent such as cupric sulfate covered with the clothing material such as cellulose acetate hydrogen phthalate are admixed to these emulsions.

In a similar manner to the aforesaid case, NaOH, the product by the passage of current, can react on this layer of the color changeable reagents, and the cellulose acetate hydrogen phthalate becomes, at the current-passed state, water-soluble and water-permeable. The oxidizing substance covered with this clothing material oxidizes the said color changeable reagent and forms insoluble dyes presenting cyan color, magenta color and yellow color respectively and the picture is obtained.

When the picture is to be formed by the dye transfer process, it is advantageous to render previously the fine particles of the aforesaid oxidizing agent to exist on that side of the layer of the color changeable reagent which is not faced with the image receiving layer. This method may be carried out in a manner as described below:

Fine particles of the oxidizing agent clothed with this clothing material are first spread, directly or with another layer inbetween, over the supporter such as paper and the like, or over the photosensitive layer, in the same method as that of the fine particles of color changeable reagent was applied as previously explained, by way of example.

It is expedient to spread the mixture of fine particles of the before mentioned color changeable reagent for more than two kinds of color directly or with a diffusion-controlling layer inbetween, such as gelatine layer and the like, over the layer of fine particles of the oxidizing agent clothed with the said clothing material. In the picture film thus constituted, NaOH, the product by the passage of current, makes the cellulose acetate phthalate water-soluble or water-permeable, and the oxidizing substance contained in this clothing material oxidizes the said color changeable reagent and forms insoluble dyes presenting cyan color, magenta color, yellow color and others, and thus the picture is obtained.

The mode of working of this operation is illustrated with reference to FIG. 3.

In FIG. 3, pile A of layers from 25 to 28 represents the multicolor picture film of the present invention. The part designated as B is illustrated only to indicate the relative positions of the counter-electrode 22 and the picture receiving layer 23, with this multicolor picture film A at the time of the picture forming operation, in the same manner as in FIGS. 1 and 2. Layer 21 is a supporter consisting of paper and the like for supporting the electrode 22 and/or the picture receiving layer 23, and layer 24 shows the layer of electrolyte solution and/or the layer of transfer processing liquid to be cast in between the said A and B during the passage of current or during the transfer.

Of layer 25, *fa*, *fb* and *fc*, forming a mosaic, are each composed both of a colored filter for color separation with a different hue from one another and a color changeable reagent with its hue corresponding to that of the filter. The colored filter and the color changeable reagent may be laminated together in a state of two separate layers, or the dye for colored filter and the color changeable reagent may be in a mixed state.

As illustrated in FIG. 2, it is desirable that the color changeable reagents be little colored, and transparent as well, so as not to hinder the color separation of the rays for exposure.

Layer S shows a layer of fine particles of oxidizing agent clothed with clothing material. Layer P shows a current-passable protective layer for protecting the photo-sensitive layer from electrolyte and the like. As this layer needs to be transparent, such a specific transparent conductive paint as shown below has been invented for this purpose and extremely satisfactory results can be acquired by using the said paint.

10 g. of silica aerogel covered with transparent and electric conductive thin layer of tin oxide was dispersed in a solution of 10 g. of methyl methacrylate in toluene, and the resulting mixture was spread in a form of a thin film and dried. The film thus dried was about 5 microns in thickness. It was then impregnated with paraffin at 60° C. The transparent conductive layer thus obtained had more than 90% of light-permeability and its electric resistance in the transverse direction was 80 ohms/cm.$^2$ and that in the direction parallel to the layer was ca. 100 megohm squares. This protective layer was extremely chemically stable.

Layer 26 is a photosensitive layer, layer 27 an electrode and layer 28 a supporter of the multicolor picture film. Necessary modification such as to interpose a diffusion-controlling layer between the layers 25 and S can, of course, be made.

As it is required, as is the case of FIG. 2, to project the exposing light in the direction L, it is necessary that all the layers of 21, 22, 23 and 24 have little coloring and are light-permeable in case of passing a current during exposure, except for the case of passing a current after exposure.

In relation to the electrode 22, which needs to be transparent, it is desirable to constitute the electrode 22 by vapor-deposition or spattering of metal in the case where the electrode 22 is put upon the layer of the color changeable reagent 25 forming a combined unit. This combined unit film is a modification of the modes exemplified in the drawing. The metallic thin film formed by vapor-deposition or spattering of metal is light-permeable and at the same time is water-permeable, and the film thus produced is extremely appropriate for this invention.

The above mentioned types of the multicolor picture film can be used in the same manner as that indicated in FIG. 2.

FIGS. 4 and 5 are respectively an enlarged sectional view showing the structure of the photo-sensitive layer having a photosensitive material of lower electric resistivity in the plane direction being divided into numerous points electrically isolated from each other and an enlarged perspective sectional view showing its essential parts. In FIGS. 4 and 5, 36 shows the photo-sensitive layer, 36a is the photo-sensitive material having a lower electric resistivity in the plane direction of its layer and 36c the electric insulator for filling up the gaps or spaces between numerous points of the said photosensitive material. 35 of FIG. 5 shows an electrode for passing a current and 34 is the supporter.

The photosensitive layer of the structure shown in the FIGS. 4 and 5 is constructed as follows:

The photosensitive material 36a is affixed as numerous points to the surface of the electrode 35 by the method of vapor-deposition or spattering using a mask which has holes arranged at spaced distances as shown in the figures, and the electric insulator 36c is provided by hardening a photo-hardening substance consisting of shellac and potassium bichromate after the space has been filled up with the said substance.

The various materials, the amounts and the arrangements of respective layers used in the preferred embodiments of the present invention are all illustrative but not limitative of the invention. It should be understood that various modifications and variations may be made in the practice of the multicolor picture films of the present invention without departing from the spirit and scope of the invention.

What is claimed is:

1. A multicolor picture film comprising; a layer containing color changeable reagents for at least two different colors with which a visible image is formed electrolytically by the passage of an electric current, said color changeable reagents being coextensive and arranged in the form of mosaic in a current passable state without one lying upon another; a mosaic color filter for color separation wherein a color corresponds to that of said color changeable reagents, a protective layer usable as an electrode for an electric current corresponding to an objective image to be reproduced, and means for providing said electric current.

2. A multicolor picture film as defined in claim 1, wherein said color changeable reagents are capable of being colored selectively by the passage of an electric current.

3. A multicolor picture film as defined in claim 1, wherein said color changeable reagents are capable of being made insoluble selectively by the passage of an electric current.

4. A multicolor picture film as defined in claim 1, wherein said color changeable reagents are capable of being faded selectively by the passage of an electric current.

5. A multicolor picture film comprising a layer of fine particles containing color changeable reagents, a photo-current passable layer, a conductive protective layer usable as an electrode, a mosaic color filter, said particles being arranged and retained on a plane surface by means of a binding agent which may selectively be denatured by the passed current, and also being made removable by subsequent treatment.

6. A multicolor picture film comprising at least one good conductive layer which is usable as electrode of an electric current, a layer containing color changeable reagents for at least two different colors with which a visible image is formed electrolytically and which is arranged in the form of mosaic without one lying upon another, a layer of a mosaic color filter wherein a color corresponds to that of said color changeable reagents and a support layer for the aforementioned layers.

7. A multicolor picture film as defined in claim 1, wherein dyes for said colored filter are those of the additive color system and said color changeable reagents are dyes of the subtractive color system.

8. A multicolor picture film which comprises a photo-current passable layer, a layer of mosaic colored filter for color separation, a layer containing color changeable reagents for at least two different colors which are coextensive and contiguous and arranged in the form of mosaic, visible image being formed with said colors through the photocurrent, at least one good conductive layer usable as an electrode for passing a current and a support layer for the aforementioned layers.

9. A multicolor picture film which comprises a photo-current passable layer, a layer containing dyes for mosaic colored filter for color separation and color changeable reagents for at least two different colors with which a visible image is formed by the photo-current and at least one good conductive layer usable as an electrode for passing a current and means defining supporting and conductive protector layer means for the aforesaid layers, said last mentioned means being coextensive with the aforesaid layers.

10. A multicolor picture film as defined in claim 9, wherein substance useful for forming visible image is retained in a state clothed by another substance which is changed in the degree of effect as a clothing material by reaction with the product formed by the passed current.

11. A multicolor picture film which comprises a photo-current passable layer, a layer of conductive protector for said photocurrent passable layer, a layer containing dyes for mosaic colored filter for color separation, a layer of color changeable reagents for at least two different colors with which a visible image is formed by the passage of current, at least one good conductive layer usable as an electrode and a layer of supporting film.

12. A multicolor picture film as defined in claim 11, wherein substance useful for forming a visible image is retained in a state clothed by another substance which is changed in the degree of effect as a clothing material by reaction with the product formed by the passed current.

13. A multicolor picture film wherein an image is formed on said film as claimed in claim 1, comprising an additional sheet whereon the desired picture is obtained on an image receiving layer by the transfer process.

14. A multicolor picture film comprising a myriad of color changeable reagent elements for at least two different colors, said elements being arranged in a mosaic layer presenting opposed faces wherein each such element is substantially coextensive from one face to the other of said layer, a second myriad of color filter elements corresponding to said at least two different colors and arranged in a mosaic layer positioned for exposure to light from a subject, said exposure resulting in the formation of a visible image in said color changeable layer that is formed electrolytically by the passage of an electric current, a support layer for said mosaic layers, and means for providing said electric current.

15. A film as claimed in claim 14 wherein the color changeable reagent elements and the color filter elements corresponding thereto are merged into a single mosaic layer.

16. A film as claimed in claim 15 wherein the color filter in each element of the mosaic layer passes substantially only light of a color which effects a color change in the color changeable reagent in said element.

17. A film as claimed in claim 14 wherein said mosaic layer of color changeable reagent elements and said mosaic layer of color filter elements are separate and distinct layers mounted opposed to each other with each color filter element passing substantially only light of a color which effects a color change in the color changeable elements substantially opposed thereto.

18. A multicolor picture film as claimed in claim 1 wherein said color changeable reagents are combined together in a receiving layer, said receiving layer comprising a counter-electrode and a supporting layer therefor.

19. A multicolor picture film comprising, a layer of transparent supporting film, a mosaic color filter, a second layer usable as an electrode for an electric current corresponding to an objective image to be reproduced, a third layer of color changeable reagents, said last layer mentioned being upon the receiving layer which contains a counter-electrode with a supporting film, and a fourth layer of an electrolyte being inserted between said third and receiving layers.

References Cited by the Examiner

UNITED STATES PATENTS

| 2,440,526 | 4/1948 | Solomon | 204—2 |
| 2,968,554 | 1/1961 | Land | 96—25 |
| 2,983,606 | 5/1961 | Rogers | 96—29 |

FOREIGN PATENTS 215,754  6/1958  Australia.

JOHN H. MACK, *Primary Examiner.*

JOSEPH REBOLD, *Examiner.*